HIGH SPEED DELTA MODULATION ENCODER

Filed May 31, 1957 4 Sheets-Sheet 1

QUANTIZERS HAVE DELAY GREATER THAN ONE SAMPLING PERIOD

INVENTOR
T. H. CROWLEY
BY Alan C. Rose
ATTORNEY

HIGH SPEED DELTA MODULATION ENCODER

Filed May 31, 1957 4 Sheets-Sheet 2

QUANTIZERS HAVE DELAY GREATER THAN TWO SAMPLING PERIODS

INVENTOR
T. H. CROWLEY
BY Alan C. Rose
ATTORNEY

HIGH SPEED DELTA MODULATION ENCODER

Filed May 31, 1957 4 Sheets-Sheet 3

QUANTIZERS HAVE DELAY GREATER THAN ONE SAMPLING PERIOD

QUANTIZERS HAVE DELAY GREATER THAN TWO SAMPLING PERIODS

INVENTOR
T. H. CROWLEY
BY Alan C. Rose
ATTORNEY

INVENTOR
T. H. CROWLEY
BY Alan C. Rose
ATTORNEY

United States Patent Office 2,916,553
Patented Dec. 8, 1959

2,916,553

HIGH SPEED DELTA MODULATION ENCODER

Thomas H. Crowley, Madison, N.J., assignor to Bell Telephone Laboratories, Incorporated, New York, N.Y., a corporation of New York Application May 31, 1957, Serial No. 662,728

12 Claims. (Cl. 179—15.6)

This invention relates to high speed encoding systems, and more specifically to delta modulation systems.

In one well known simple form of delta modulation, signal information is transmitted by the presence or absence of pulses in successive time intervals. The transmitted pulses are applied to identical integrating circuits at the transmitter and the receiver. Assuming that the pulses are positive, the integrating circuits are biased to reduce their output level with time. At the transmitter the output from the integrator is compared with the original signal at a rate which is termed the "sampling" rate, or frequency. If the instantaneous input signal is greater than the output from the integrator at the start of a sampling period, a positive-going pulse is transmitted during the sampling interval to increase the integrator output; if the signal is less than the integrator output, no pulse is transmitted during the sampling period, and the output level of the integrator is reduced by the negative bias of the integration circuit.

The sampling frequency of a delta modulation system is normally several times higher than the highest frequency included in the input signal. Accordingly, when delta modulation systems are employed for the transmission of broad-band signals extending to a relatively high frequency, very high sampling rates are required. However, the process of comparing two signals and producing an output signal of unit amplitude or no signal, depending on the result of the comparison, is a moderately complex electrical operation and requires at least a minimum amount of time in each technology which is employed. The result of this limitation of the speed of quantization is an apparent limitation on the sampling rate of delta modulation systems.

Accordingly, the principal object of the present invention is to increase the sampling frequency of delta modulation systems to a rate which is higher than the maximum rate for successive quantization operations of the type described above.

In accordance with one realization of the present invention, a delta modulation encoder is provided with at least two quantization circuits which are biased differently to give the proper output signals for any combination of output pulse patterns in the immediately preceding sampling period or periods. A high speed switching circuit which is responsive to the pulse pattern during these immediately preceding sampling periods connects the encoder output circuit to the proper quantization circuit. The slower acting quantization circuits can then have two or more sampling periods to perform the quantization function, and the faster acting switching circuitry can select the quantizer with the correct output signal between successive output pulse periods. This arrangement increases the time available for the quantization operation by the number of quantizers which are employed.

It is a feature of the invention that at least two quantizers arranged to operate at different input levels are employed in a delta modulation encoding system and that a switching circuit selectively couples one of the quantization circuits to the delta modulation encoder output.

A complete understanding of this invention and of its features and objects may be gained from a consideration of the following detailed description and the accompanying drawing, in which.

Figure 1:
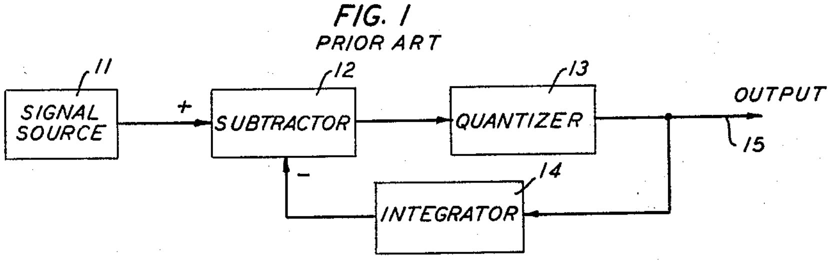
FIG. 1 PRIOR ART
Fig. 1 represents a delta modulation system of the prior art.

Referring more particularly to the drawing, Fig. 1 shows a delta modulation system including a signal source 11, a subtractor 12, a quantization circuit 13, and an integrator circuit 14. In the circuit of Fig. 1, signals having one of two possible values appear at the output circuit 15 during successive sampling intervals. As mentioned in the description of delta modulation systems in the introduction, identical integration circuits are employed at the encoder and the decoder. The output from the integration circuit 14 at the encoder, shown in Fig. 1, is compared with the input signal from the source 11 in the subtractor 12. The output signal from the quantization circuit 13 is designed to increase or decrease the output from the integration circuit 14 so that it more closely approximates the input signal during successive sampling periods. The output signals from the quantizer 13 may be positive or negative pulses, or may be pulses of a single polarity which act in opposition to a bias provided in the integration circuit 14. In this latter case, the absence of a pulse permits a shift in level by the bias provided in the integration circuit and therefore produces essentially the same result as that accomplished by the use of positive and negative pulses. The delta modulation circuit shown in Fig. 1 is well known, and is disclosed, for example, in J. F. Schouten et al. Patent 2,662,118, granted December 8, 1953, and in an article by F. de Jager entitled "Delta Modulation" which appeared at pages 442 through 466 in volume 7 of the Philips Research Reports, 1952.

Circuits of the type shown in Fig. 1 and described in the publications noted above are eminently satisfactory for many purposes, particularly when relatively low sampling rates are employed. However, when the sampling rate is increased to accommodate higher input signals, the speed of operation of the quantization circuits becomes a limiting factor. In the quantization circuit, it is necessary to produce one of two distinct output signals, depending on the relative amplitude of the input signals. This circuit requirement of discriminating between input levels in a nonlinear manner is a relatively difficult electrical operation and requires a certain minimum time in each technology which is employed. It is also interesting to note that electronic switching in response to input signals of a standard level can normally be accomplished at a much higher speed than the quantization operation.

In the following description, two types of speed-limited quantizers will be considered. In the first type of quantization circuit, input signals can be received and output quantized signals can be produced at the required sampling rate, but the elapsed time between the application of an input pulse and the occurrence of a decision is greater than the desired sampling period. Typical examples of this first type of quantization are distributed amplification tubes combined with level discriminating circuitry and quantization circuits which include a number of critically biased triodes interconnected by delay lines so that the amplitude of applied pulses is either progressively increased or decreased. The second type of quantization circuit is too slow both in the over-all delay produced by the circuit and in the speed at which signals can be processed by the circuit. Typical quantization circuits of this type are multivibrators and blocking oscillators.

Figure 2:
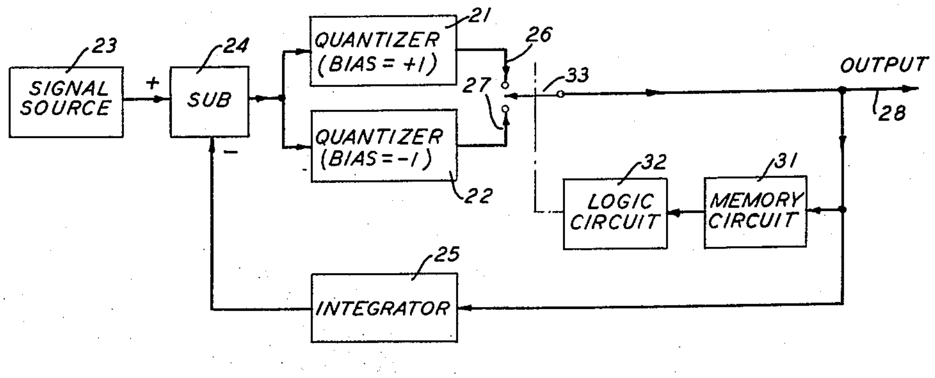
Fig. 2 is a block diagram of a delta modulation encoder in accordance with the present invention.

Fig. 2 shows a high speed delta modulation circuit in which quantizers of the first type mentioned above are employed. Thus, the quantizers 21 and 22 of Fig. 2 can receive pulses at the sampling rate, but have an internal delay greater than one but less than two sampling periods. The conventional delta modulation circuit components which are included in Fig. 2 include the signal source 23, the subtractor 24, and the integrator 25. In the normal quantization circuit, in each sampling interval the output of the quantizer is designed to increase or decrease the output of the integrator so that this output is more nearly equal to that provided by the signal source 23. When slow acting quantizers such as 21 and 22 in Fig. 2 must be employed, however, the input signal to the quantizers must be supplied more than one sampling period in advance. At this time the value of the synthesized signal is not known, because the decision in the previous sampling period is not yet available.

However, although the correct synthesized signal is not yet known, the only two possible levels that it might have are its present value plus or minus one unit, depending on the value of the output signal occurring during the time required to obtain a decision. Two quantization circuits 21 and 22 are therefore provided in accordance with an aspect of my invention, and they are biased to different levels so that the correct output level always appears at the output leads 26 or 27 from one of these quantization circuits. The different biases of the two quantization circuits are indicated by the legends in the boxes 21 and 22 of Fig. 2. This same function could be accomplished by providing different output signals from the subtraction circuit 24 and biasing both of the quantizers at the same level.

It is necessary that the output circuit 28 be selectively connected to the output leads 26 or 27 during each digit period, in accordance with the presence or absence of an output pulse during the preceding digit period. This is accomplished in the circuit of Fig. 2 by the memory cell 31 and the logic circuit 32. The memory cell 31 is shown to indicate the function of remembering the output pulse for one sampling period, and the logic circuit 32 indicates the required switching function. In actual operation, if a pulse has been applied to the integration circuit 25 during the preceding interval, the output from the integration circuit will be increased by one unit with respect to the signal from the source 23. With the synthesized signal from the integration circuit 25 being subtracted from the signal from the source 23, this effectively reduces the zero level by one unit. However, it may be observed that the quantization circuit 22 is biased to minus one unit. Accordingly, the output on lead 27 from the quantizer 22 is the correct signal. Therefore, when a pulse is received at the memory cell 31, the switch 33 is connected to lead 27 for the next subsequent sampling period. In the circuit of Fig. 2, therefore, the apparent limitation imposed by the slow rate of operation of quantization circuits has been overcome by the use of two parallel quantizers in combination with switching circuits which operate at a higher rate of speed.

In one sense, the technique described in the foregoing paragraphs may be compared with the formulation of a number of battle plans and inserting each one into a pigeonhole. Later, when the particular tactical situation so dictates, the correct battle plan for the occasion may be pulled out of the pigeonhole and utilized. Such systems are necessarily wasteful in that a number of alternative decisions which are never employed must be calculated; however, in delta modulation systems the advantage of increased speed and the resulting increase in permissible bandwidth of the input signal more than justifies the few additional electrical components which are required.

Figure 3:
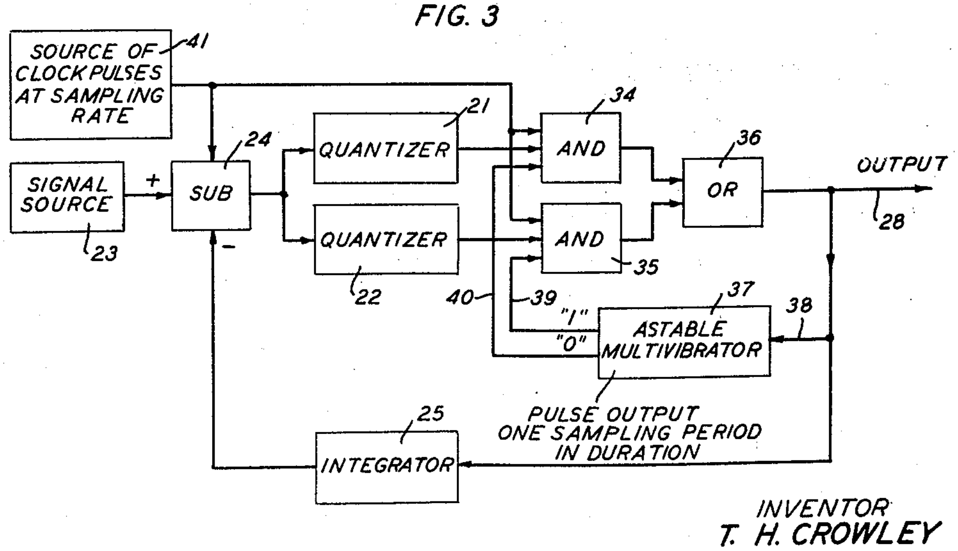
Fig. 3 is a logic circuit diagram of the system of Fig. 2.

Fig. 3 is a block diagram indicating in somewhat greater detail the mode of operation of the circuit of Fig. 2. In general, the circuit elements in Fig. 3 which correspond directly to those of Fig. 2 bear the same reference numerals. In Fig. 3, the AND circuits 34 and 35 and the OR circuit 36 have been substituted for the switch 33 of Fig. 2. In addition, the astable multivibrator 37 has been substituted for the memory cell 31 and logic circuit 32 of Fig. 2. The astable multivibrator 37 is normally in the "0" state and is shifted to the "1" state upon the application of a pulse on lead 38 from the output circuit 28. The multivibrator has a time constant such that it stays in the "1" state for approximately one sampling period. Thus, during the sampling period following the appearance of a pulse on output lead 28, the AND unit 35 is enabled by the energization of lead 39 connected to the "1" output of the astable multivibrator 37. In the absence of a pulse on the output lead 28, the multivibrator 37 remains in the "0" state, and the AND unit 34 is enabled by the energization of lead 40. A source of clock pulses 41 having a frequency equal to the desired sampling rate is also shown in Fig. 3. The output from the source of clock pulses is connected to enable the subtractor 24 and the selected AND unit 34 or 35. Accordingly, accurately timed output pulses are transmitted through the AND circuit 34 or 35, depending on the presence or absence of output pulses during the preceding sampling interval.

Figure 4:
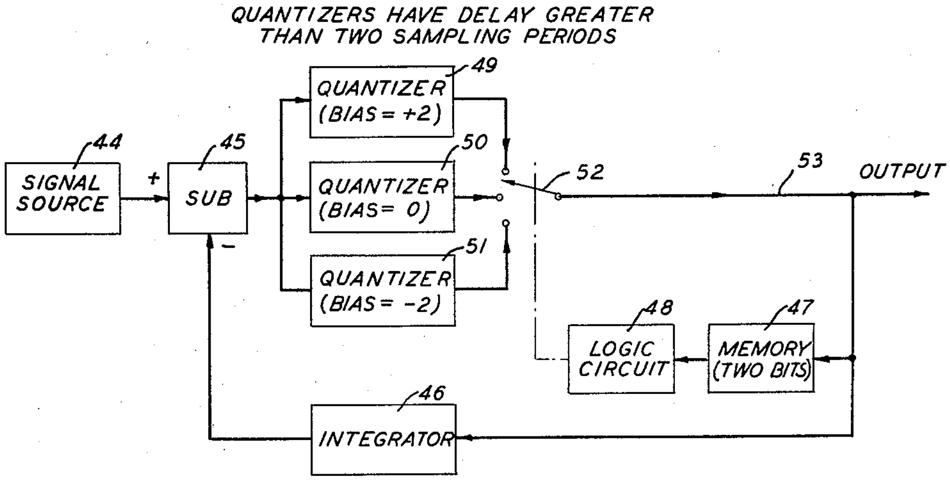
Fig. 4 represents another delta modulation encoder in accordance with the invention.

The circuit of Fig. 4 includes the signal source 44, the subtractor 45, the integration circuit 46, a memory circuit 47 capable of storing two binary digits or bits of information, and a logic circuit 48. The delta modulation circuit of Fig. 4 also includes three quantizers 49, 50, and 51. The switch 52 is controlled by the logic circuit 48 to connect the appropriate quantizer to the output circuit 53 of the encoder. In the delta modulation system of Fig. 4, it is assumed that the quantizers require more than two and less than three sampling periods to perform the required quantization operation. For this reason, two output pulses must be stored in the memory circuit 47. In addition, it may be readily seen that the two output signals occurring between the application of signals to the quantization circuits and the completion of the quantization operation can produce a shift in level of two units in either direction, or may counteract one another. Accordingly, three quantization circuits 49, 50, and 51, which are biased to plus two units, zero, and to a level of minus two units, respectively, are required. Memory and electronic switching circuitry such as that indicated at 47 and 48 in Fig. 4 are well known in the art. Typical circuits of this type are disclosed in "The Design of Switching Circuits" by William Keister et al., D. Van Nostrand Company, Inc., New York, 1951, for example. The implementation of the switch 52 in Fig. 4 may be handled as indicated by the AND units 34 and 35 and the OR unit 36 in Fig. 3. Accordingly, in the circuit of Fig. 4 it has been shown that the use of slow quantization circuits with higher sampling rates may be extended to quantization circuits which require more than two sampling periods for their operation. Similarly, higher sampling rates or slower quantization circuits may be employed by a further extension of the principles illustrated in Figs. 2 through 4.

Figure 5:
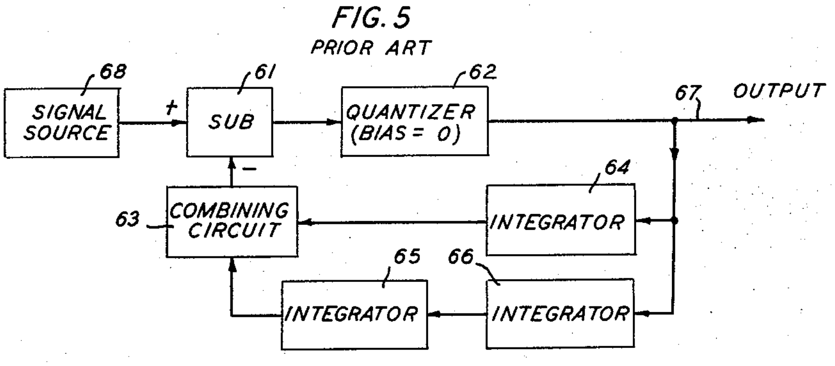
FIG. 5 PRIOR ART
Fig. 5 shows a prior art delta modulation encoder circuit in which the slope of the synthesized signal is changed during successive sampling intervals.

Fig. 5 is another type of delta modulation circuit which is well known in the prior art. In the delta modulation art it is generally designated a "second order" delta modulation encoder. The circuit of Fig. 5 includes a subtractor 61, a quantization circuit 62, a combining circuit 63, and three integration circuits 64, 65, and 66. As in the earlier delta modulation systems which were considered, the output at lead 67 may assume either one of two values during successive sampling intervals. These output signals may be in the form of positive or negative pulses or form of pulses and the absence of pulses in successive sampling periods, as in the earlier systems. For the purposes of describing the circuit of Fig. 5, however, it will be assumed that positive and negative output pulses are employed.

Second order delta modulation systems operate on the basis of changing the slope of a synthesized signal during successive sampling periods. The synthesized signal at the output of the combining circuit 63 in Fig. 5 would therefore be expected to be a series of straight lines having a slope which changes during each sampling period and which generally approximates the output signal from the source 68. If the output of the quantizer 62 could be obtained instantaneously, the two integrators 65 and 66 would be sufficient to obtain the synthesized signal described in the preceding sentence. However, because the quantizer 62 introduces a finite amount of delay, the additional integration circuit 64 is required to provide an impulse to restore the synthesized signal to the value it would have had if the output of the quantization circuit were available immediately.

Figure 6:
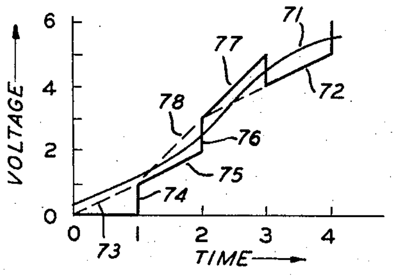
Fig. 6 shows some plots of the electrical wave forms at various points in the circuit of Fig. 5.

Fig. 6 is a graphical showing of the wave forms at the output of the signal source 68 and the combining circuit 63. In Fig. 6 the smooth curve 71 represents the output of the signal source 68, and the irregular solid curve 72 is the synthesized signal at the output of the combining circuit 63. In Fig. 6 the abscissa represents time and is designated in terms of sampling intervals. At time $t=0$ the output of the combining circuit 63 is zero, and the output of the signal source 68 has some finite value. This information is applied to the quantizer 62.

If the quantizer 62 could operate instantly, it would be desirable to change the slope of the synthesized signal at once by one increment of slope, as indicated by the dotted line 73. It may be noted that in the showing of Fig. 6 an incremental change of slope of one unit of voltage in a given sampling period has been selected. The quantization circuit 62 of Fig. 6 does not in fact operate instantaneously, and only produces the desired positive output pulse at time $t=1$. This positive impulse is applied both to the single integration circuit 64 and to the double integration circuit including the integrators 65 and 66. The single integration circuit 64 provides an impulse indicated by the vertical solid line 74 in Fig. 6, and the double integration circuit 65 and 66 provides the desired upward slope of the characteristic indicated at 75 as a continuation of the desired dashed line characteristic 73.

The subtraction circuit 61 compares the input signal 71 with the synthesized signal at time $t=1$ immediately following the impulse represented by the vertical line 74. Because the synthesized signal at this point is not yet as great as the input signal 71, a positive signal is again applied to the quantizer 62. Accordingly, at time $t=2$ another positive impulse is provided as indicated by the vertical line 76, and the slope of the characteristic is increased as indicated by the solid line 77. The steeply sloping line 77 is now a continuation of the dashed line 78, which would be the proper characteristic for a second order delta modulation system having a quantizer which operated instantaneously. The synthesizing process is continued during subsequent sampling intervals to produce the remainder of the characteristic 72 which generally approximates the original input signal 71. This system and the circuits required to implement it are described in somewhat greater detail in the De Jager article cited above.

Figure 7:
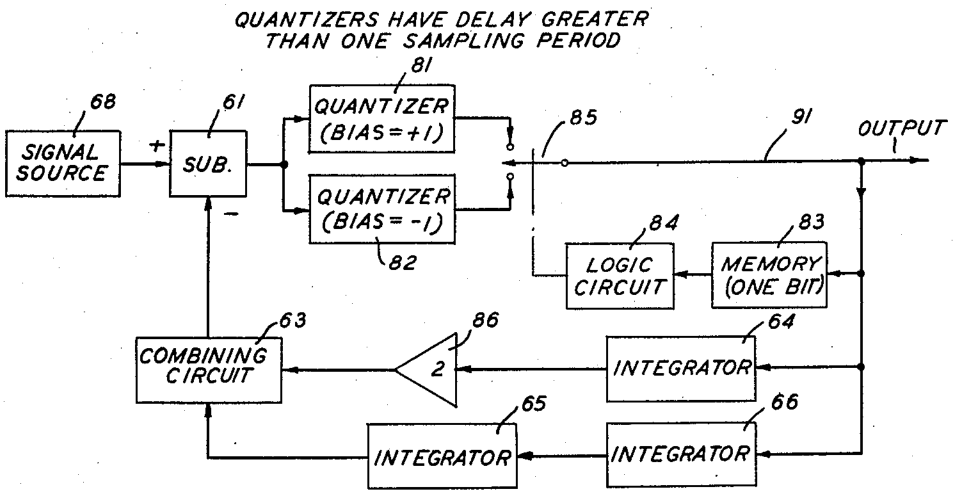
Fig. 7 is a circuit diagram of a delta modulation system of the type shown in Fig. 5 modified in accordance with the principles of the present invention.

The circuit of Fig. 7 is a modification of the circuit of Fig. 5 in accordance with the present invention to permit the use of higher sampling rates. In the circuit of Fig. 7, the components which are identical with those of Fig. 5 bear the same reference numerals. As in the circuits of Fig. 2, two parallel quantization circuits 81 and 82 are employed. In addition, the memory circuit 83, the logic circuit 84, and suitable switching circuitry indicated at 85 are also required. The amplifier circuit 86, in which the numeral 2 appears, is shown in Fig. 7 to indicate that the contribution from the integration circuit 64 in Fig. 7 is twice that of the integration circuit 64 in Fig. 5 at the output of the combining circuit 63.

Figure 8:
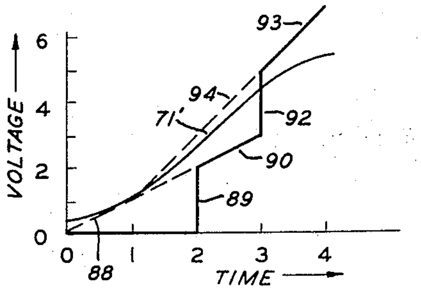
Fig. 8 shows several plots of electrical wave forms at various points in the circuit of Fig. 7.

The operation of the circuit of Fig. 7 will now be considered with reference to Fig. 8. In Fig. 8, the characteristic 71' is identical with the characteristic 71 which appeared in Fig. 6. In addition, the ordinate and abscissa scales are the same in Fig. 8 as in Fig. 6. For the purposes of Fig. 7, it is assumed that the quantizers 81 and 82 require nearly two sampling intervals to produce an output signal. Thus the indication in Fig. 8 at time $t=0$ would require the positive slope indicated by the dashed line 88. The quantization circuit 82 has finally decided that an increase in slope is appropriate at time $t=2$. In order to approximate the desired characteristic 88 as nearly as possible, the integration circuit 64 and the weighting amplifier 86 produce the impulse represented by the vertical line 89 in Fig. 8. The double integration circuit 65, 66 provides the upwardly sloping straight line 90 which then constitutes a continuation of the original desired characteristic 88.

At time $t=3$ the decision from time $t=1$ appears at the output circuit 91 of the delta modulation encoder. Because the previous signal at time $t=2$ was a positive pulse, the switch 85 couples the output from the quantizer 81 to the output circuit 91. However, it may be observed that at time $t=1$ the input signal 71' is more than one unit greater than the (zero) level of the synthesized signal. Accordingly, the output of the quantizer 81 is another positive pulse. This is indicated by the vertical line 92 in the synthesized signal characteristic. The increased slope provided by the double integration circuit 65, 66 is indicated by the steeply sloping characteristic 93 in Fig. 8. It may be observed that the slope of the characteristic 93 is a continuation of the desired signal indicated by the dashed line 94 which deviates from the dashed line 88 at time $t=1$.

From the foregoing description, it is evident that the required biasing levels for the quantizers 81 and 82 are plus one and minus one units, respectively. In addition, the requirement that the logic circuit 84 place the switching circuit 85 in the state in which it interconnects quantizer 81 to the output circuit 91 following a positive pulse is also apparent. Accordingly, the circuits 83 and 84 and the switching circuit 85 may be instrumented as indicated in Fig. 3 for the corresponding circuit elements of Fig. 2. With reference to Figs. 6 and 8, it may be noted that the required impulses provided by the integrating circuit 64 in Fig. 7 must be twice the magnitude of those provided by the integration circuit 64 in Fig. 5. This difference is indicated in Fig. 7 by the addition of the amplification circuit 86.

Since the sequence of output pulses provided on lead 91 in Fig. 7 is exactly the same as that provided on lead 67 of Fig. 5, the signals transmitted to the decoder are exactly the same in each case. The output pulses from the circuit of Fig. 7 are, of course, delayed by one sampling interval. However, this is not significant in practice, since there is a much larger delay involved in transmitting the pulses from the encoder to the decoder. Accordingly, by the changes indicated by the differences in Fig. 7 as contrasted with Fig. 5, the delta modulation pulse sampling rate may be doubled, with a corresponding increase in the band width of signals which may be transmitted.

Figure 9:
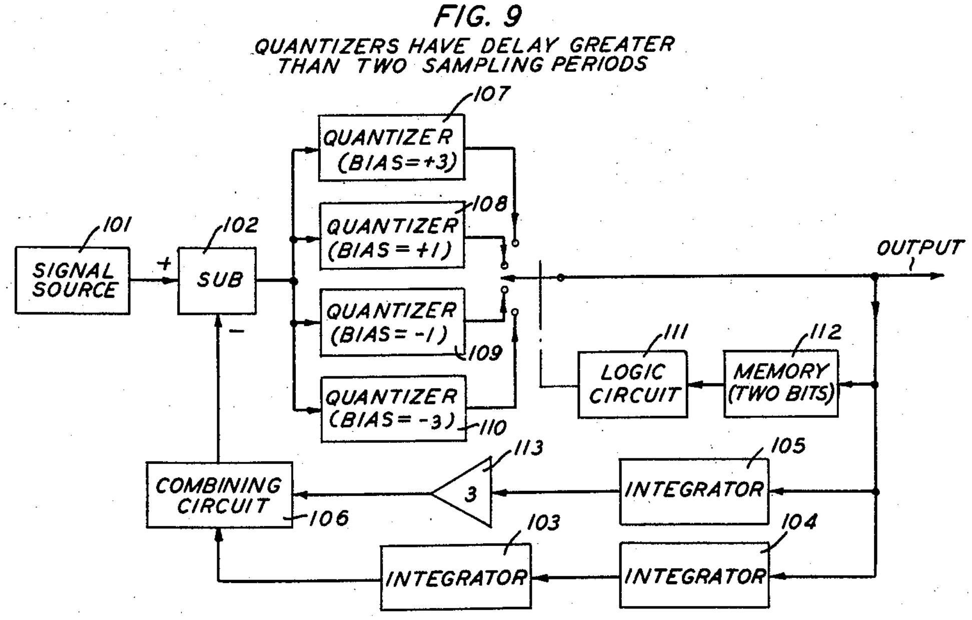
Fig. 9 represents another delta modulation encoder in accordance with the invention.

Fig. 9 is another second order delta modulation encoder in accordance with the invention. In the circuit of Fig. 9, the quantization circuits introduce a delay of slightly less than three sampling periods. The circuit of Fig. 9 includes the signal source 101, the subtractor 102, the double integration circuit 103, 104, the single integration circuit 105, and the combining circuit 106, found in the standard second order delta modulation systems of the prior art. In addition, the circuit of Fig. 9 requires four parallel quantizers 107, 108, 109, and 110 to provide the various possible correct output signals for pulse patterns occuring during the two preceding sampling periods. The logic circuit 111 and the memory circuit 112 for storing two binary digits of information are also required for the implementation of the circuit of Fig. 9. It will be recalled that the circuit of Fig. 7 required an amplification weighting factor of two for the single integration circuit as compared with that provided by the standard second order delta modulation circuit. In Fig. 9, the amplification circuit 113 provides a weighting factor of three as compared with that provided by the standard second order delta modulation system of Fig. 5. This is required by the three digit periods which elapse from the time of application of input signals to the quantizers 107 through 110 until the receipt of output pulse signals.

The required biases for the four quantizers of the circuit of Fig. 9 turn out to be plus three units, plus one unit, minus one unit, and minus three units. These values may readily be derived through the use of a simple diagram such as that of Fig. 8. One of the interesting points to be noted is that successive positive and negative pulses do not restore the level of the output of the combining circuit to the original value. The resultant operation of the circuit of Fig. 9 is closely analogous to that of Fig. 7, as shown in the plots of Fig. 8.

In the discussion of the circuits of Figs. 2, 3, 4, 5, 7, and 9, the use of quantizers of one class has been assumed. More specifically, it was assumed that the quantizers employed in these earlier figures of the drawing could receive input signals at the required sampling rate, but that they had a delay in producing the output signal which was greater than a single sampling period. Other types of quantization circuits not only have an elapsed time from input to output which is unduly long, but also cannot receive input signals at the required high speed. Typical quantizers of this latter type are multivibrators and blocking oscillators. It may be noted that this second type of quantization circuit characteristically includes feedback or regeneration.

Figure 10:
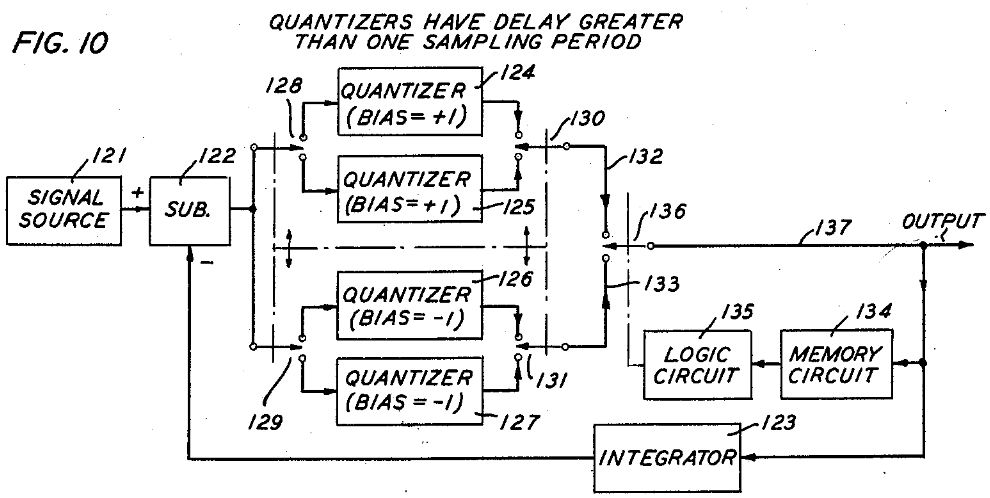
Fig. 10 is a block diagram of a delta modulation system in accordance with the invention in which the quantization circuits are speed-limited in the rate at which information may be processed.

The circuit of Fig. 10 illustrates a modified version of the circuit of Fig. 3 in which quantizers of this second type are employed. Fig. 10 is a delta modulation encoder of the basic first order type in which successive positive or negative pulses are merely summed by the integration circuit. The encoder includes the signal source 121, the subtraction circuit 122, and the integrator 123 required of all basic delta modulation circuits. In addition, the four quantization circuits 124 through 127 are provided. The synchronized switches 128 through 131 perform a multiplexing function, with alternate signals from the subtractor 122 being applied to the pair of quantization circuits 124 and 126 in parallel, and then to the quantizers 125 and 127 in parallel. It may be noted that both of the quantizers 124 and 125 are biased to plus one unit, and both of the quantizers 126 and 127 are biased to minus one unit. With this arrangement, the correct output signal will always appear either on lead 132 or lead 133 during successive output periods, depending on the output signal during the preceding sampling interval. The memory circuit 134 and the logic circuit 135 are provided to control the operation of the switching circuit 136. In this manner, the correct lead 132 or 133 is always connected to the output circuit 137 during each digit period.

With the exception of the use of four quantizers instead of two, the operation of the circuit of Fig. 10 is identical with that of Figs. 2 and 3. The extra quantizers 125 and 127 and the switches 128 through 131 are required by virtue of the regenerative nature of each of the quantizers 124 through 127. These circuits cannot receive an additional input signal until the output signal has been withdrawn. Accordingly, a set of quantizers must be provided for each sampling period required by the quantizers for their operation.

Figure 11:
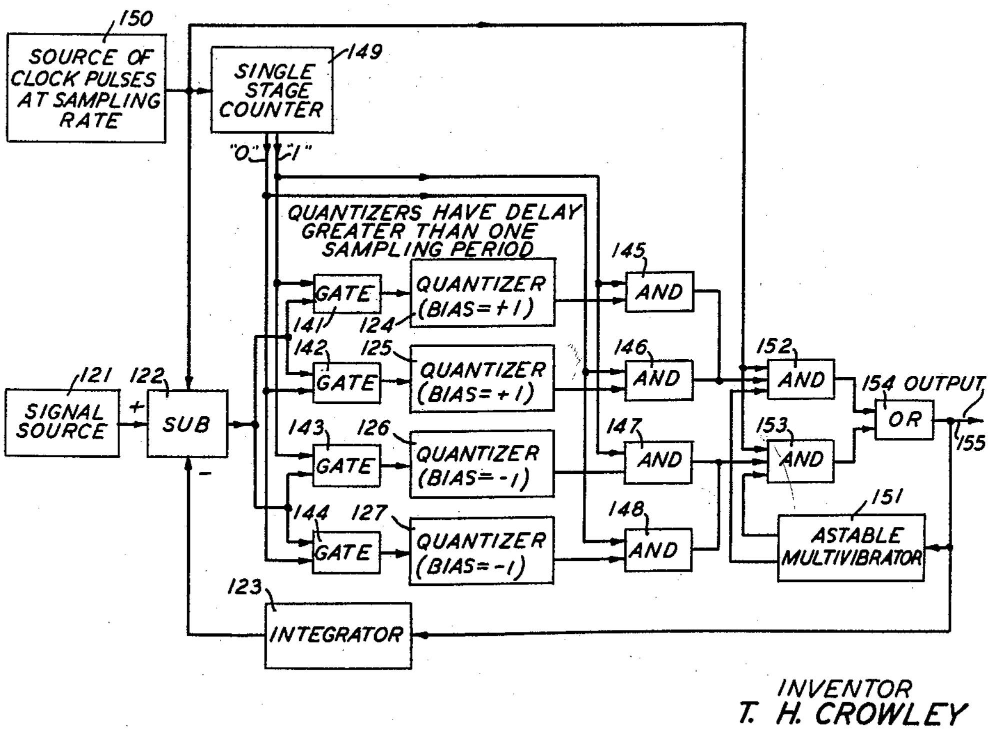
Fig. 11 is a logic circuit diagram of the circuit shown in Fig. 10 in block diagram form.

Fig. 11 is a relatively detailed logic circuit diagram of the circuit shown in Fig. 10. In Fig. 11, the circuit components which are the same as those shown in Fig. 10 bear identical reference numerals. These include the relatively conventional components such as the signal source 121, the subtractor 122, the integrator 123, and the quantization circuits 124 through 127.

In the circuit of Fig. 11 the gates 141 through 144 and the AND circuits 145 through 148 perform the functions of the switches 128 through 131 in Fig. 10. The gates 141 through 144 and the AND circuits 145 through 148 are controlled by the single stage counter 149. When the counter circuit 149 is in the "0" state, the gate circuits 142 and 144 and the AND circuits 146 and 148 are enabled. This effectively connects the quantization circuits 125 and 127 into the delta modulation system. When the counter circuit 149 is in the "1" state, however, the circuits 141, 143, 145, and 147 are enabled to connect quantizers 124 and 126 into the delta modulation system. The counter circuit 149 is shifted between states by the source of clock pulses 150. The pulse repetition rate of the source of clock pulses 150 is equal to the sampling rate of the delta modulation system. Accordingly, the single stage counter 149 is shifted from one state to the other during successive sampling periods. The output of the source of clock pulses 150 may also be coupled to gate the output of the subtractor 122.

The astable multivibrator 151, the two AND units 152 and 153, and the OR circuit 154 are employed as in the circuit of Fig. 3 to connect the encoder output lead 155 to the correct quantizer output lead. The source of clock pulses 150 is connected to a third input of the AND circuits 152 and 153 to accurately time the output signals which are to be applied to the output circuit 155 of the encoder.

In the foregoing description of Figs. 1 through 11 it has been shown that slow speed quantization circuits may be employed with quantization rates which are several times greater than the time period required for the quantization function. Quantization circuits which are speed-limited either as to the speed at which information can be received or in their over-all time of operation may be employed.

The principles of this invention have been described above by reference to illustrative delta modulation systems. However, the same principles may be extended to provide the solution to other instrumentation problems having comparable limiting factors. In general, the circuit requirements must involve output signals of high granularity as compared with the input signals. The two-state output of a delta modulation encoder as contrasted with the continuously variable input signal is a good example of a high granularity output as compared with a very low granularity input. In addition, the output signal must depend both on the output signal during preceding sampling intervals and on the value of the input signal. Under these circumstances, the principles of the present invention will normally permit the use of higher sampling rates through the use of paralleled slow "decision" circuitry, and higher speed switching circuits to select the proper output signal as the encoder output.

It is be understood that the above-described arrangements are illustrative of the application of the principles of the invention. Numerous other arrangements may be devised by those skilled in the art without departing from the spirit and scope of the invention.

What is claimed is:

1. In a delta modulation system, a source of signals, an output circuit for delta modulation pulse signals, an integrator connected to said output circuit, a subtractor connected to receive input signals from said signal source and said integrator, a plurality of quantizers connected in parallel to the output of said subtractor, switching means for selectively connecting one of said quantizers to said output circuit, and circuit means connected to said output circuit and responsive to the signals appearing on said output circuit for controlling the state of said switching means.

2. In a delta modulation system, a source of input signals, an output circuit for delta modulation pulse signals, means coupled to said output circuit for synthesizing an approximate indication of said input signal, said synthesizing means including at least one integrator, a plurality of quantizers, comparison means for simultaneously applying signals to said quantizers indicating the difference between said synthesized signals and said input signal, switching means for connecting one of said quantizers to said output circuit, and circuit means connected to said output circuit and responsive to the signals appearing on said output circuit for controlling the state of said switching means.

3. In combination, a source of input signals, an output circuit for delta modulation pulse signals, means coupled to said output circuit for synthesizing an approximate indication of said input signal, a plurality of quantizers, comparison means for simultaneously applying signals to said quantizers indicating the difference between said synthesized signals and said input signal, switching means for connecting one of said quantizers to said output circuit, and circuit means connected to said output circuit and responsive to the signals appearing on said output circuit for controlling the state of said switching means.

4. In a high speed encoding circuit, an output circuit for transmitting signals of high granularity during successive time periods, circuit means for storing an indication of previous output signals, a source of input signals of relatively low granularity as compared with said output signals, at least two parallel decision circuit means for developing alternative output signals, said decision circuit means being connected to receive signals derived from said source of input signals and said storage circuit means, switching circuit means for connecting the output of one of said decision circuits to the output circuit of said encoder during each time period, and means for selectively controlling said switching means in accordance with signals appearing at said output circuit of said encoder.

5. In a delta modulation encoding circuit, an output circuit for transmitting signals of high granularity during successive time periods, circuit means for storing an indication of previous output signals, a source of input signals of relatively low granularity as compared with said output signals, at least two parallel quantization circuit means having operation times greater than one of said time periods for developing alternative output signals, said quantization circuit means being connected to receive signals derived from said source of input signals and said storage circuit means, and switching circuit means responsive to said output signals for connecting the output of one of said quantization circuit means to said output circuit during each time period.

6. An encoding circuit as defined in claim 5 wherein means are provided for biasing said two quantization circuit means for operation at respectively different levels.

7. An encoding circuit as defined in claim 5 wherein said storage circuit means includes a double integration circuit and a single integration circuit.

8. An encoding circuit as defined in claim 5 wherein at least three quantization circuit means are provided, and wherein each quantization circuit means has an operation time greater than two of said time periods.

9. An encoding circuit as defined in claim 8 wherein said circuit means for storing an indication of previous output signals is a single integration circuit, and wherein two of said quantization circuit means are biased to equal positive and negative values and one of said quantization circuit means is biased to zero.

10. An encoding circuit as defined in claim 8 wherein said storage circuit means includes a double integration circuit and a single integration circuit, and wherein at least four quantization circuit means are provided.

11. A delta modulation system comprising a source of signals, an output circuit, a plurality of quantizers connected in parallel, means for applying to said quantizers signals which are a function of the output of said signal source and of signals priorly appearing at said output circuit, switching means for selectively connecting one of said quantizers to said output circuit, and means connected to said output circuit for controlling said switching means.

12. A delta modulation system in accordance with claim 11 further comprising a quantizer in parallel with each of said plurality of said quantizers, and means for alternately applying to said quantizers said signals which are a function of said outputs from said signal source and of said signals priorly appearing at said output circuit.

References Cited in the file of this patent

UNITED STATES PATENTS

| | | |
|---|---|---|
| 2,636,081 | Feldman | Apr. 21, 1953 |
| 2,732,424 | Oliver | Jan. 24, 1956 |